US011585433B2

(12) United States Patent
Hagerman (10) Patent No.: US 11,585,433 B2
(45) Date of Patent: Feb. 21, 2023

(54) GEAR WHEEL AND A VEHICLE TRANSMISSION ARRANGEMENT

(71) Applicant: VOLVO TRUCK CORPORATION, Gothenburg (SE)

(72) Inventor: Henrik Hagerman, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/643,028

(22) Filed: Dec. 7, 2021

(65) Prior Publication Data

US 2022/0196142 A1 Jun. 23, 2022

(30) Foreign Application Priority Data

Dec. 18, 2020 (EP) .................................... 20215511

(51) Int. Cl.
*F16H 57/04* (2010.01)
*F16H 55/17* (2006.01)

(52) U.S. Cl.
CPC ......... *F16H 57/0493* (2013.01); *F16H 55/17* (2013.01); *F16H 57/045* (2013.01); *F16H 57/0457* (2013.01)

(58) Field of Classification Search
CPC ... F16H 57/0457; F16H 57/0409; F16H 55/17
See application file for complete search history.

(56) References Cited

U.S. PATENT DOCUMENTS 1,658,654 A * 2/1928 Richardson et al. ........................ F16H 57/0498 384/620
3,200,919 A * 8/1965 Lanigan .................. F16D 41/22 192/21
3,743,067 A * 7/1973 Bokovoy ................ F16D 41/22 192/48.91

(Continued)

FOREIGN PATENT DOCUMENTS

EP 3204664 A1 8/2017
FR 519869 A 6/1921

(Continued)

OTHER PUBLICATIONS

European Search Report dated May 17, 2021 in corresponding European Patent Application No. 20215511.5, 9 pages.

*Primary Examiner* — Jake Cook
(74) *Attorney, Agent, or Firm* — Venable LLP; Jeffri A Kaminski (57) ABSTRACT

A gear wheel is connectable to a transmission shaft of a vehicle gear transmission arranged in a gearbox housing. The gear wheel being configured to be lubricated by a lubricant in a lubricant reservoir of the gearbox housing, wherein the gear wheel comprises a first axial end surface; a second axial end surface arranged on an opposite side of the gear wheel relative to the first axial end surface; and a plurality of gear teeth arranged circumferentially on the gear wheel and positioned between the first and second axial end surfaces; wherein the first axial end surface comprises a (Continued)

plurality of angularly spaced protrusions extending axially from the first axial end surface in a direction of a surface normal of the first axial end surface.

15 Claims, 5 Drawing Sheets

(56) References Cited

U.S. PATENT DOCUMENTS

| | | | | |
|---|---|---|---|---|
| 4,096,932 | A | * | 6/1978 | Liberty, Jr. .............. F16D 23/00 192/48.91 |
| 6,109,393 | A | | 8/2000 | Toyota et al. |
| 8,448,771 | B2 | | 5/2013 | Kuwashima |
| 10,436,308 | B2 | * | 10/2019 | Kuboki ............... F16H 57/0427 |
| 2009/0084210 | A1 | * | 4/2009 | Tsukada .................. F16D 11/10 74/330 |
| 2013/0065724 | A1 | * | 3/2013 | Shinohara ............ B60K 17/046 475/159 |
| 2016/0003339 | A1 | * | 1/2016 | Roberts, III ............ F16H 55/17 74/446 |
| 2016/0265650 | A1 | | 9/2016 | Wu |
| 2016/0281838 | A1 | | 9/2016 | Wu |
| 2017/0234408 | A1 | * | 8/2017 | Thompson .............. F16H 63/30 74/337 |

FOREIGN PATENT DOCUMENTS

| | | | |
|---|---|---|---|
| GB | 227235 | A | 1/1925 |
| JP | 2007192309 | A | 8/2007 |
| WO | 2016055304 | A1 | 4/2016 |
| WO | 2018118126 | A1 | 6/2018 |

* cited by examiner

GEAR WHEEL AND A VEHICLE TRANSMISSION ARRANGEMENT

TECHNICAL FIELD

The present disclosure relates to a gear wheel connectable to a transmission shaft of a vehicle gear transmission. The present disclosure also relates to a vehicle transmission arrangement comprising such a gear wheel. Although the gear wheel will be described in relation to a vehicle transmission for a heavy-duty vehicle, the gear wheel can also be efficiently incorporated in other vehicle transmission arrangements in which a gear wheel is arranged at least partly in a lubricant present in a lubricant reservoir.

BACKGROUND

In connection to e.g. low-, medium and heavy duty vehicles, also commonly referred to as trucks, a transmission arrangement is connected to a prime mover for controlling torque loads from the prime mover to the propelled wheels of the truck.

The transmission arrangement is positioned in a gearbox housing and preferably comprises a plurality of transmission shafts, wherein a first shaft often comprises at least one gear wheel which is arranged in meshed connection with a gear wheel arranged on a second shaft.

The lubrication and cooling of the gear wheels are conventionally accomplished by means of a lubricant arranged in a lubricant reservoir of the gearbox housing. Preferred lubricant is an oil lubricant and the lubricant reservoir is often referred to as an oil sump. The gear wheel is at least partly positioned below the lubricant surface when the transmission shaft, at which the gear wheel is connected, rotates, the gear wheel transports the lubricant to e.g. other gear wheels arranged within the gearbox housing.

However, the rotation of the gear wheel in the lubricant represents a source of power losses for the transmission arrangement due to the inherent inertia and friction of the lubricant. There is thus a desire to further reduce the power losses generated by this type of cooling and lubrication arrangement.

SUMMARY

It is an object of the present disclosure to describe a gear wheel which at least partially overcomes the above-described deficiencies. This is achieved by a gear wheel according to claim 1.

According to a first aspect, there is provided a gear wheel connectable to a transmission shaft of a vehicle gear transmission arranged in a gearbox housing, the gear wheel being configured to be lubricated by a lubricant in a lubricant reservoir of the gearbox housing, wherein the gear wheel comprises a first axial end surface; a second axial end surface arranged on an opposite side of the gear wheel relative to the first axial end surface; and a plurality of gear teeth arranged circumferentially on the gear wheel and positioned between the first and second axial end surfaces; wherein the first axial end surface comprises a plurality of angularly spaced protrusions extending axially from the first axial end surface in a direction of a surface normal of the first axial end surface.

The wording "protrusion" should be construed such as a change in geometry of the first axial end surface which generates alternating indentations between the protrusions. Thus, an indentation is present between two consecutive protrusions. The protrusions may extend axially from the first axial end surface, or provided by e.g. excavating material on the first axial end surface. In the latter case, the protrusions are formed by the material remaining when forming the indentations. The protrusion, thus, has a major extension in the same direction as the direction of the surface normal of the first axial end surface, i.e. in an opposite direction compared to a surface normal of the second axial end surface.

Furthermore, the first and second axial end surfaces should not necessarily be construed as a respective surface having a surface normal extending only in the axial direction, i.e. the direction of the transmission shafts. The first and second axial end surfaces may alternatively have a conical shape. In such a case, the surface normal is extending in a somewhat angled configuration relative to the axial direction.

The present disclosure is based on the insight that the angularly spaced protrusions will generate a plurality of air pockets when the gear wheel rotates in the lubricant, where each air pocket is arranged between two consecutive protrusions. An advantage is that the overall power consumption for the vehicle will be reduced as the friction when rotating the gear wheel in the lubricant is reduced. It has been unexpectedly realized that the indentations formed between the angularly spaced protrusions will contain substantially no lubricant, but rather containing air. It was realized that this occurs due to an inertial effect in the boundary layer. Also, the air contained in the generated air pockets has the additional advantage of providing air bubbles into the lubricant present in the lubricant reservoir, which makes the lubricant less viscous whereby the inherent inertia of the lubricant is reduced. A further advantage is that the reduction of friction will enable for an improved control of the temperature in the gearbox, and as such an increased operational lifetime.

According to an example embodiment, each of the plurality of angularly spaced protrusions may comprise a surface inclined relative to the first axial end surface. The inclined form of the protrusions can efficiently contribute to the formation of air pockets between the protrusions. According to an example embodiment, the inclined surface may be inclined relative to the first axial end surface up to 45 degrees. However, other design of the protrusions is also conceivable, such as e.g. forming the plurality of protrusions in a distorted sawtooth-formation.

According to an example embodiment, the inclined surface may be a plane inclined surface. By "plane" should be construed as substantially flat. When using a plane surface, the lubricant will flow tangent to the plane surface and "jump across" the indentation formed between the protrusions such as to efficiently form an air pocket. The inclined surface may also be slightly curved, etc.

According to an example embodiment, each of the plurality of angularly spaced protrusions may comprise a radial extension along the first axial end surface. Hereby, the protrusion extends along the first axial end surface in the radial direction of the gear wheel. Preferably, and according to an example embodiment, each of the plurality of angularly spaced protrusions may extend in an at least partially radial direction from a radial inner end portion of the first axial end surface. Preferably, the radial extension extends to a radial outer end portion of the first axial end surface for obtaining as large air pocket as possible.

According to an example embodiment, each of the plurality of angularly spaced protrusions may be arranged at a circumferential position of the first axial end surface corresponding to an axial end position of a gear tooth. Hereby, it is possible to also radially extend the protrusion to be arranged on the axial end position of the gear tooth.

According to an example embodiment, the plurality of angularly spaced protrusions may be arranged on the first axial end surface as an external member. As an alternative, and according to an example embodiment the plurality of angularly spaced protrusions may instead be integrally formed with the first axial end surface.

According to an example embodiment, each of the plurality of angularly spaced protrusions may comprise a circumferential extension.

By circumferential extension should be construed such that the protrusion is not only extending in the pure radial direction. Accordingly, and according to an example embodiment, the circumferential extension may be formed by an inclination of the protrusion along the first axial end surface. Hereby, the protrusion extends radially as well as circumferentially, whereby the inclination is relative to the pure radial direction.

According to an example embodiment, each of the plurality of angularly spaced protrusions may comprise a curve-shaped portion. Thus, the extension is in this embodiment not a straight extension but comprises one or more curvatures along the radial extension.

According to an example embodiment, the gear wheel may comprise a second plurality of angularly spaced protrusions arranged on the second axial end surface and extending axially from the second axial end surface in a direction of a surface normal of the second axial end surface. Hereby, the vicious friction can be even further reduced, thus even further reducing the overall power consumption for the vehicle.

According to an example embodiment, each of the angularly spaced protrusions may comprise a driving end and a trailing end, the trailing end protrudes axially from the first axial end surface to a greater extent than the driving end, wherein the gear wheel is configured to rotate in a rotational direction in which the driving end is configured to reach the lubricant in the lubricant reservoir before the trailing end reaches the lubricant.

According to a second aspect, there is provided a vehicle transmission arrangement arranged in a gearbox housing comprising a lubricant reservoir with a lubricant, the vehicle transmission arrangement comprising a transmission shaft and a gear wheel connected to the transmission shaft, wherein the gear wheel is at least partially positioned in the lubricant reservoir for receiving lubrication, the gear wheel comprising a first axial end surface; a second axial end surface arranged on an opposite side of the gear wheel relative to the first axial end surface; and a plurality of gear teeth arranged circumferentially on the gear wheel and positioned between the first and second axial end surfaces; wherein the gear wheel comprises a plurality of angularly spaced protrusions arranged on the first axial end surface and extending axially from the first axial end surface in a direction of a surface normal of the first axial end surface.

According to an example embodiment, each of the angularly spaced protrusions may comprise a driving end and a trailing end, the trailing end protrudes axially from the first axial end surface to a greater extent than the driving end, wherein the gear wheel is configured to rotate in a rotational direction in which the driving end reaches the lubricant in the lubricant reservoir before the trailing end reaches the lubricant.

According to an example embodiment, the vehicle transmission arrangement may further comprise an input shaft arranged to receive a torque from a vehicle prime mover, and an output shaft arranged to provide a torque to wheels of a vehicle, wherein the transmission shaft is a counter shaft arranged to transmit the torque from the input shaft to the output shaft.

According to an example embodiment, the counter shaft may be arranged at a lower position compared to the position of the input shaft and the output shaft in the gearbox housing when the gearbox is connected to the vehicle.

It should however be readily understood that the gear wheel can be arranged on other shafts of a transmission arrangement as well, as long as the gear wheel receives lubricant as described above in relation to the first aspect. Other transmission arrangements are thus conceivable which does not comprise the above described counter shaft.

Further effects and features of the second aspect are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Figure 1:
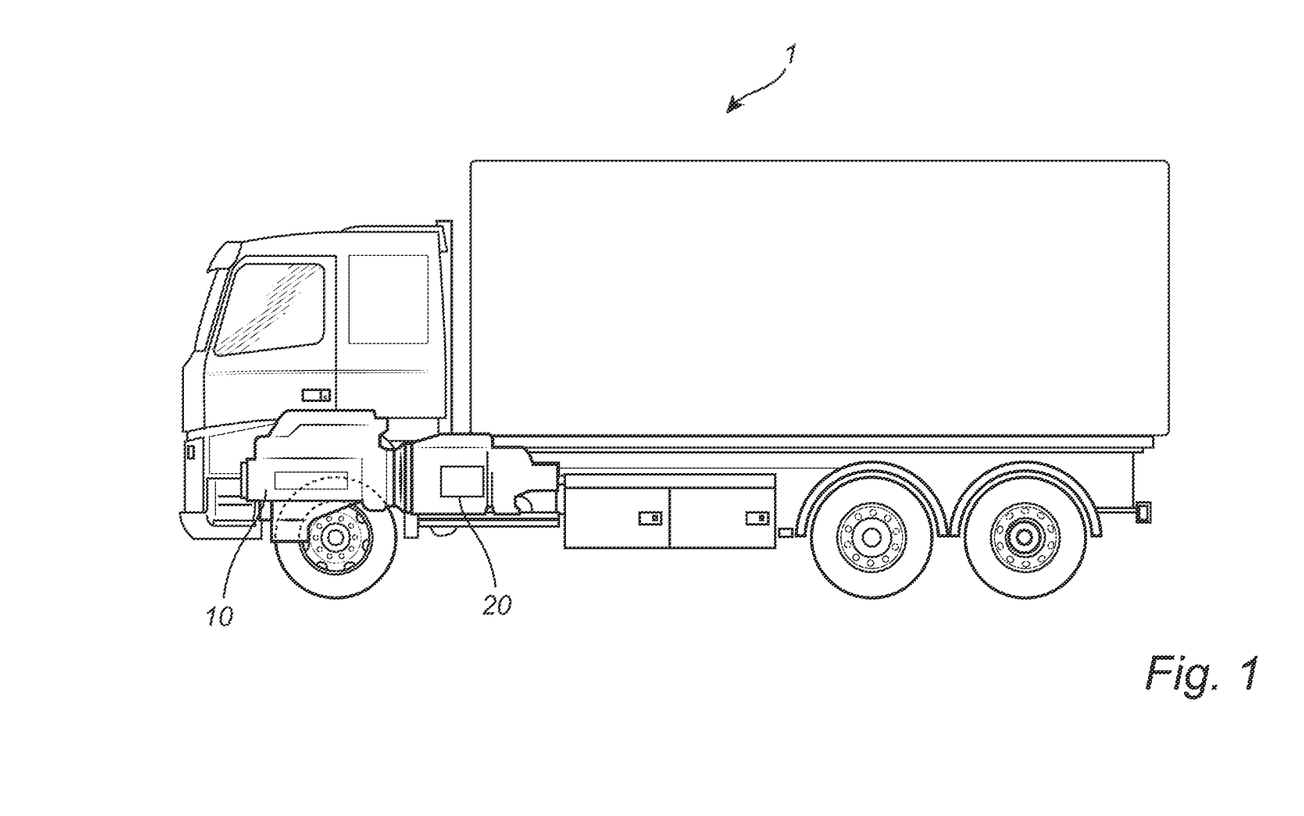
FIG. 1 is a side view illustrating a vehicle according to an example embodiment.

With reference to FIG. 1, which is a side view illustrating a vehicle 1 in the form of a truck. The vehicle comprises a prime mover 10, exemplified as an internal combustion engine (ICE) arrangement for propulsion of the vehicle 1, and a vehicle gear transmission 20 arranged between the ICE 10 and a wheel axle for controllably change gears during operation of the vehicle 1. Although the prime mover 10 is exemplified as an ICE, other alternatives are also conceivable for connection to the vehicle gear transmission 20. Such alternative is preferably an electric motor, or an electric machine.

Figure 2:
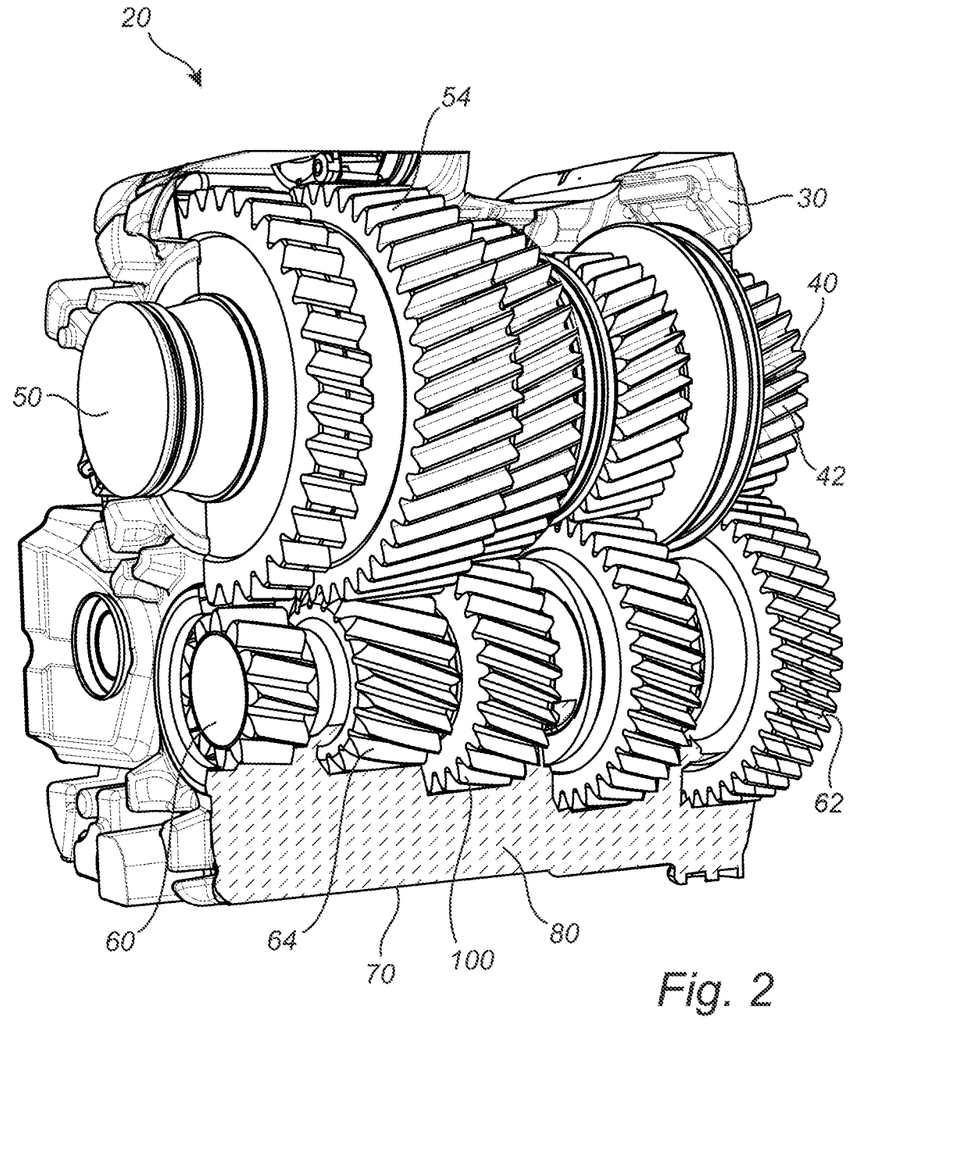
FIG. 2 is a cut-out view of a vehicle gear transmission according to an example embodiment.

In order to describe the vehicle gear transmission 20 in further detail, reference is made to FIG. 2. FIG. 2 is a cut-out view of the vehicle gear transmission 20 according to an example embodiment. As can be seen, the vehicle gear transmission 20 is arranged within a gearbox housing 30 and comprises a plurality of transmission shafts 40, 50, 60. The transmission shafts 40, 50, 60 each comprises at least one gear wheel for transmission of torque. In particular, the vehicle gear transmission 20 comprises an input shaft 40 arranged to receive a torque from the ICE 10, an output shaft 50 arranged to provide a torque to the wheels of the vehicle 1. The torque transmitted from the output shaft 50 is greater or less than the torque received by the input shaft from the ICE 10. As an alternative, a 1:1 ratio may also be provided between the torque from the ICE and the torque provided to the wheels for at least one of the transmission gears of the vehicle gear transmission 20.

Moreover, the vehicle gear transmission 20 exemplified in FIG. 2 also comprises a counter shaft 60. The counter shaft 60 is positioned below the input 40 and output 50 shafts and is arranged to transmit a torque from the input shaft 40 to the output shaft 50. In further detail, a torque from the input shaft 40 is transmitted to the counter shaft 60 via a gear stage comprising a first gear wheel 42 of the input shaft 40 in meshed connection with a first gear wheel 62 of the counter shaft 60. The torque on the counter shaft 60 is thereafter transmitted to the output shaft 50 via a gear stage comprising a second gear wheel 64 on the counter shaft 60 in meshed connection with a first gear wheel 54 on the output shaft 50. The torque may of course be transmitted from the input shaft to the output shaft in a plurality of different ways and the above thus merely serves as one option.

As is further illustrated in FIG. 2, the gearbox housing 30 comprises a lubricant reservoir 70 at a bottom portion of the gearbox housing 30. The lubricant reservoir 70 comprises a lubricant 80 arranged to lubricate the gear wheels and the transmission shafts of the vehicle gear transmission 20 during operation. The lubricant 80 is also arranged as a coolant to reduce the heat of e.g. the gear wheels generated during operation. As can be seen, the gear wheels arranged on the counter shaft 60 are at least partly submerged into the lubricant. When the gear wheels on the counter shaft rotate, the lubricant is flowing along with the rotation of the gear wheels and lubricates the components of the vehicle gear transmission.

Figure 3:
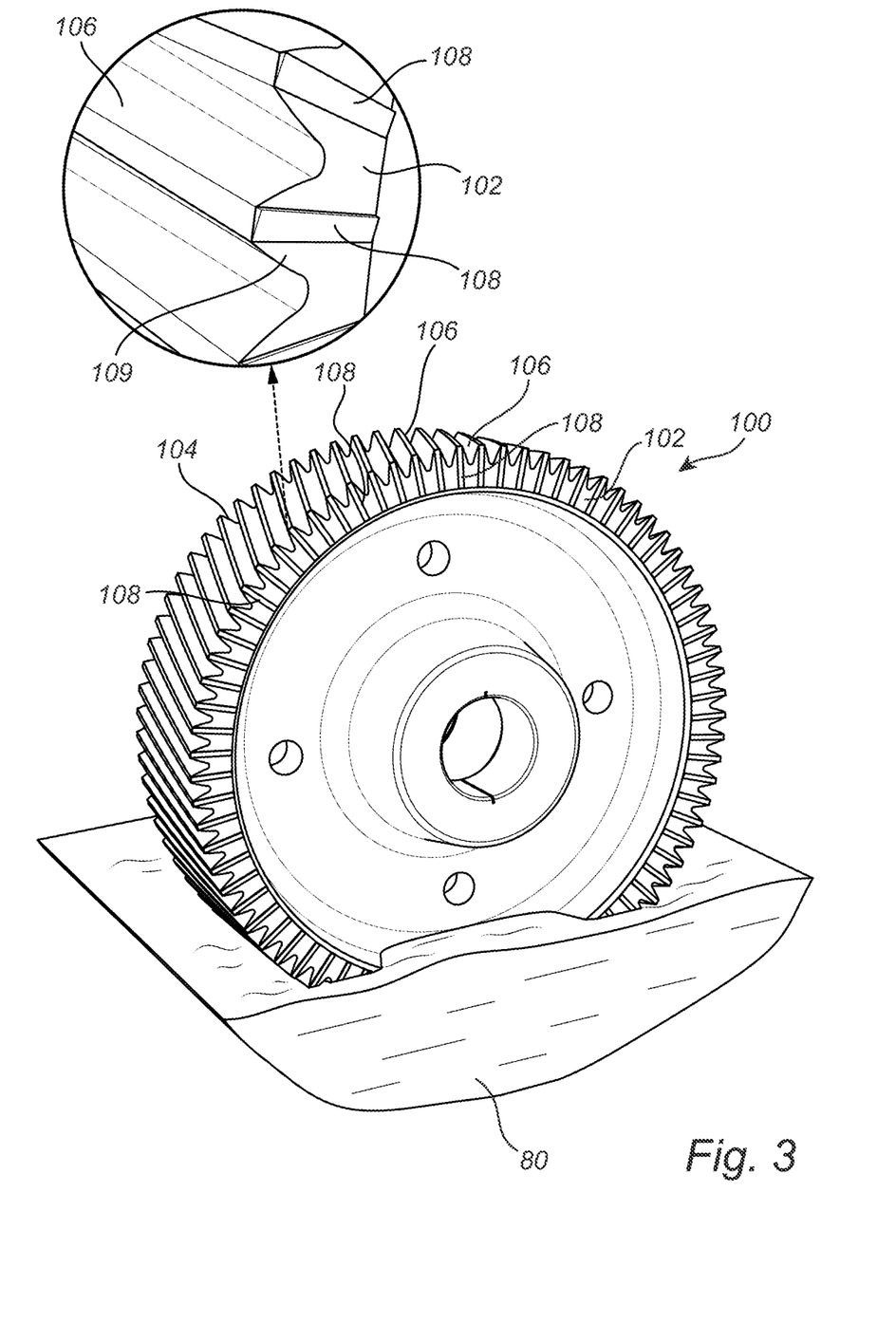
FIG. 3 is a perspective view of a gear wheel at least partly submerged in a lubricant according to an example embodiment.
Figure 4:
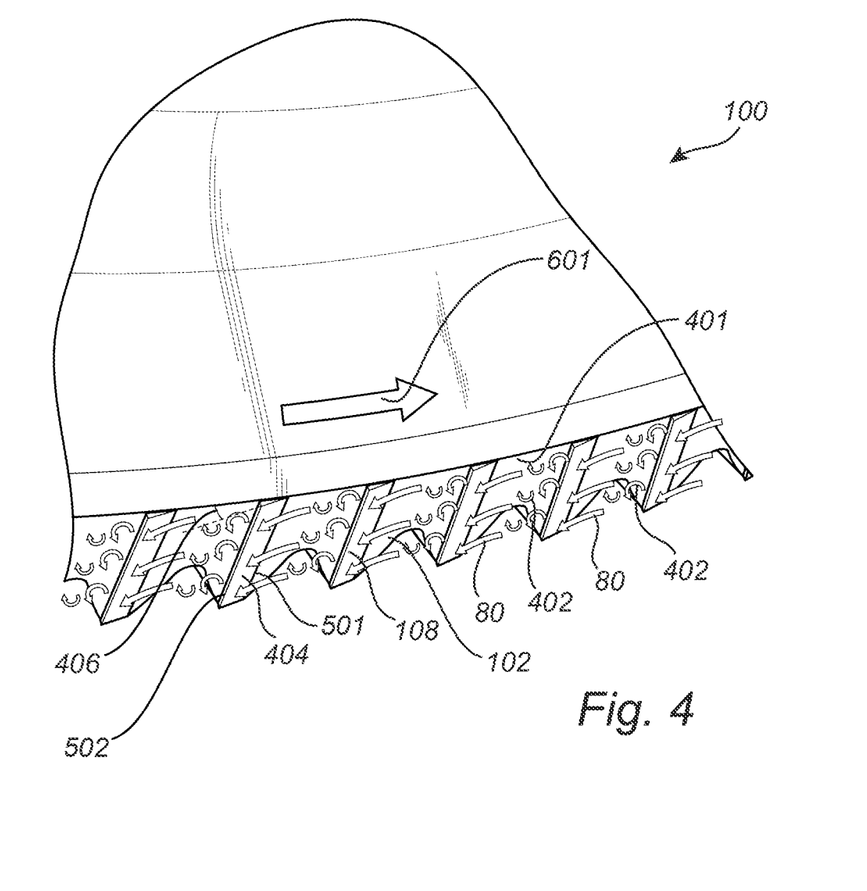
FIG. 4 is a detailed illustration of angularly spaced protrusions of the gear wheel according to an example embodiment.
Figure 5:
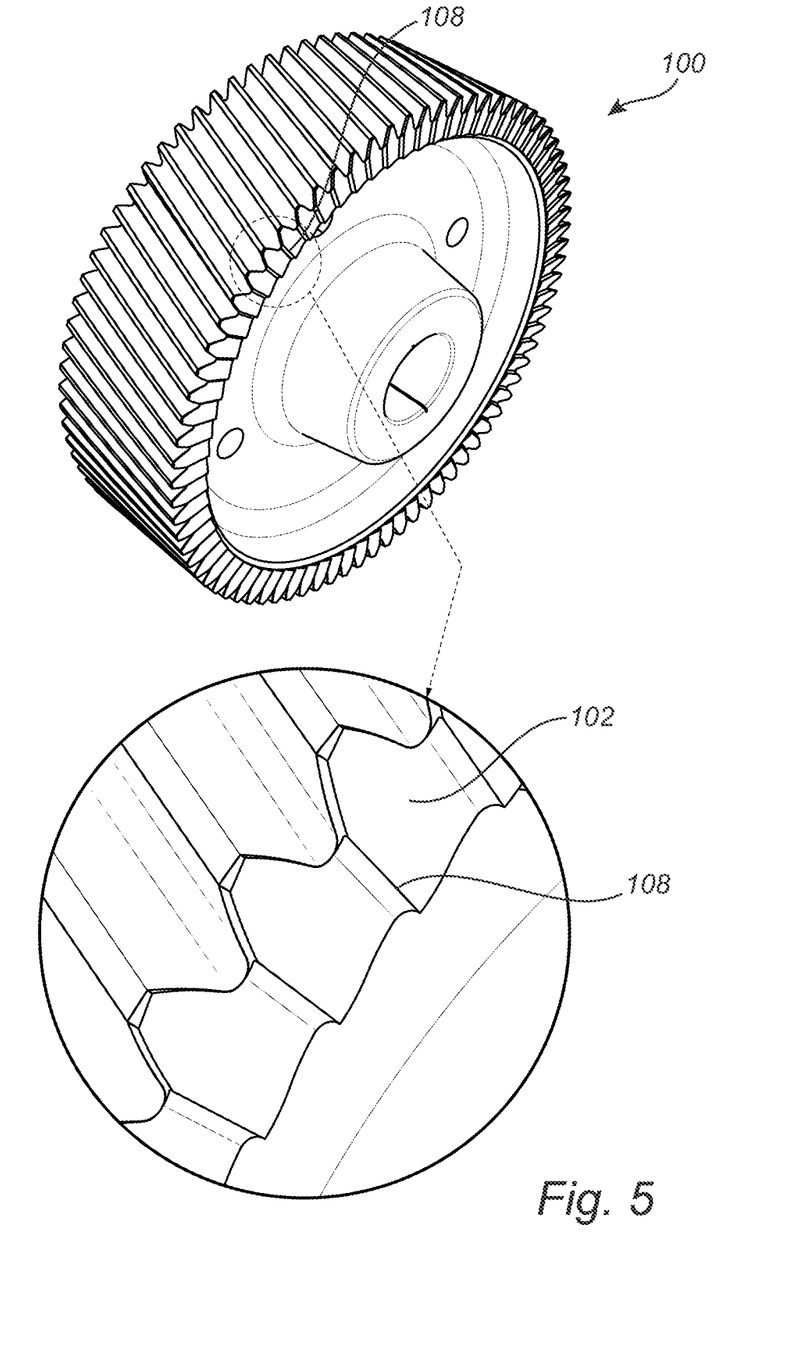
FIG. 5 is a perspective view of the gear wheel according to another example embodiment.

The following will now describe various example embodiments of the gear wheels connected to the counter shaft. Reference is therefore made to FIGS. 3-5 which illustrate the gear wheel 100 of the counter shaft according to various example embodiments. The configuration of the gear wheel described in the following can of course be implemented on each of the gear wheels of the counter shaft, or any gear wheel in a vehicle gear transmission which is at least partly submerged in a lubricant 80. Thus, the gear wheel described in the following does not necessarily have to be positioned on a counter shaft.

Starting with FIG. 3 which is a perspective view of the gear wheel 100 at least partly submerged in the lubricant 80 according to an example embodiment. The gear wheel 100 comprises a first axial end surface 102 and a second axial end surface 104. The first 102 and second 104 axial end surfaces are arranged on opposite sides of the gear wheel 100 as seen along the direction of the counter shaft (not shown in FIG. 3). The gear wheel 100 further comprises a plurality of gear teeth 106 arranged around a circumferential surface of the gear wheel 100 and positioned between the first 102 and second 104 axial end surfaces. Thus, the gear teeth 106 extend between the first 102 and second 104 axial end surfaces. In the example embodiment depicted in FIG. 3, the gear teeth 106 extend between the first 102 and second 104 axial end surfaces in both an axial direction as well as in a circumferential direction.

As can be seen in the enlarged portion of the first axial end surface 102 of the gear wheel 100, the first axial end surface 102 comprises a plurality of protrusions 108.

The plurality of protrusions 108 are angularly spaced along the circumferential direction of the first axial end surface 102. Each one of the plurality of angularly spaced protrusions 108 protrudes in the axial direction. In detail, the axial protrusion should be seen as extending away from the first surface. In even further detail, the axial protrusion should be seen as extending in a direction of the surface normal of the first axial end surface, i.e. in an opposite direction of the surface normal (not shown) of the second axial end surface 104. It should be readily understood that the second axial end surface 104 may also comprise a plurality of angularly spaced protrusions 108 as the first axial end surface 102, although this is not depicted in FIG. 3.

According to the example embodiment depicted in FIG. 3, the first axial end surface comprises an equal number of angularly spaced protrusions 108 as the number of gear teeth 106 for the gear wheel 100. Also, each of the angularly spaced protrusions 108 may extend along an axial end portion 109 of a respective gear tooth 108.

The plurality of angularly spaced protrusions 108 may form an integral part of the first axial end surface 102, i.e. the protrusions 108 are formed during the casting/forging/machining process of the gear wheel 100. As an alternative, the plurality of angularly spaced protrusions may be arranged on the first axial end surface as an external member. In such a case, the protrusions 108 are connected to the first axial end surface 102 after the casting/forging/machining process of the gear wheel 100. The protrusions 108 can here be connected to the first axial end surface 102 by e.g. providing a groove or trace in the first axial end surface 102, wherein a clip or similar geometric configuration arranged at the backside of the protrusion 108 is positioned in the trace for connecting the protrusion 108 to the first axial end surface 102. Other alternatives are also conceivable such as e.g. welding the protrusions 108 to the first axial end surface 102, or connecting the protrusion 108 to the first axial end surface 102 using a screw connection, etc.

The functionality of the plurality of protruding portions are now described with reference to FIG. 4. When rotating the gear wheel 100, lubricant 80 from the lubricant reservoir 70 is following the first axial end surface 102 of the gear wheel in the circumferential direction, whereby the components of the vehicle gear transmission 20 receives lubricant therefrom. By means of the plurality of angularly spaced protrusions 108, indentations 401 are formed between two consecutive protrusions 108. Hereby, during rotation of the gear wheel 100, lubricant will not reach the area between the protrusions 108 whereby air pockets 402 are formed at these indentations 401. To put it simple, the lubricant 80 will flow along the first axial end surface 102 and "jump over" the indentations formed between the protrusions so as to form the air pockets 402 between the protrusions. The air in these air pockets is thereafter provided into the lubricant 80 within the lubricant container 70.

According to the embodiment depicted in FIG. 4, each of the plurality of angularly spaced protrusions comprises a surface 404 which is inclined relative to the first axial end surface 102 by an inclination angle 406. According to a non-limiting example, the inclined surface may be inclined up to 45 degrees from the first axial end surface 102. The inclined surface 404 is substantially flat whereby the flow of lubricant can easily swipe along the inclined surface 404 and directed over the indentation 401. As can be seen in FIG. 4, each of the angularly spaced protrusions comprises a driving end 501 and a trailing end 502. The trailing end 502 of the protrusion protrudes axially from the first axial end surface 102 to a greater extent compared to the driving end 501. To a greater extent should thus be construed as the axial protrusion of the trailing end 502 is larger than the axial protrusion of the driving end 501. During rotation of the gear wheel 100, the flow of lubricant will first reach the driving end 501, and thereafter flow on the surface 404 of the protrusion in a circumferential and an axial direction until the flow of lubricant reaches the trailing end 502. The surface 404 is thus inclined in the axial and circumferential directions from the driving end 501 to the trailing end 502. During operation, and as can be seen in FIG. 4, the gear wheel rotates in a rotational direction 601. The trailing end 502 is arranged circumferentially in front of the driving end 501 in the rotational direction, whereby the driving end 501 reaches the lubricant in the lubricant reservoir before the lubricant reaches the trailing end 502.

Turning now to FIG. 5, which illustrates the gear wheel 100 according to another embodiment. In the embodiment depicted in FIG. 5, the plurality of angularly spaced protrusions 108 are formed in a distorted sawtooth-formation. Thus, the plurality of angularly spaced protrusions 108 are together arranged in the form of saw teeth. The functionality described above in relation to FIG. 4 is still obtained by means of this configuration of the protrusions 108. As can be further gleaned from FIG. 5, and which is also valid for the embodiments depicted in FIGS. 3 and 4, the plurality of angularly spaced protrusions comprises a radial extension along the first axial end surface and extends from a radial inner end portion of the first axial end surface. Each of the plurality of angularly space protrusions 108 may also comprise a component extending in the circumferential direction along the first axial end surface. Thus, the protrusions are hereby slightly angled in the circumferential direction along their radial extension.

Although not depicted in any of the figures, the plurality of angularly spaced protrusions may comprise a curve-shaped portion. In such a case, the protrusions extend radially with a curvature. Such curvature may, for example, be C-shaped, S-shaped, etc.

It is to be understood that the present disclosure is not limited to the embodiments described above and illustrated in the drawings; rather, the skilled person will recognize that many changes and modifications may be made within the scope of the appended claims.

The invention claimed is:

1. A gear wheel connectable to a transmission shaft of a vehicle gear transmission arranged in a gearbox housing, the gear wheel being configured to be lubricated by a lubricant in a lubricant reservoir of the gearbox housing, wherein the gear wheel comprises a first axial end surface; a second axial end surface arranged on an opposite side of the gear wheel relative to the first axial end surface; and a plurality of gear teeth arranged circumferentially on the gear wheel and positioned between the first and second axial end surfaces; wherein the first axial end surface comprises a plurality of angularly spaced protrusions extending axially from the first axial end surface in a direction of a surface normal of the first axial end surface, wherein each of the angularly spaced protrusions comprises a driving end and a trailing end, the trailing end protrudes axially from the first axial end surface to a greater extent than the driving end, wherein the gear wheel is configured to rotate in a rotational direction in which the driving end is configured to reach the lubricant in the lubricant reservoir before the trailing end reaches the lubricant.

2. The gear wheel according to claim 1, wherein each of the plurality of angularly spaced protrusions comprises a surface inclined relative to the first axial end surface.

3. The gear wheel according to claim 2, wherein the inclined surface is inclined relative to the first axial end surface up to 45 degrees.

4. The gear wheel according to any one of claim 2, wherein the inclined surface is a plane inclined surface.

5. The gear wheel according to claim 1, wherein each of the plurality of angularly spaced protrusions comprises a radial extension along the first axial end surface.

6. The gear wheel according to claim 5, wherein each of the plurality of angularly spaced protrusions extends in an at least partially radial direction from a radial inner end portion of the first axial end surface.

7. The gear wheel according to claim 1, wherein each of the plurality of angularly spaced protrusions is arranged at a circumferential position of the first axial end surface corresponding to an axial end position of a gear tooth.

8. The gear wheel according to claim 1, wherein the plurality of angularly spaced protrusions is arranged on the first axial end surface as an external member.

9. The gear wheel according to claim 1, wherein the plurality of angularly spaced protrusions is integrally formed with the first axial end surface.

10. The gear wheel according to claim 1, wherein each of the plurality of angularly spaced protrusions comprises a circumferential extension.

11. The gear wheel according to claim 10, wherein the circumferential extension is formed by an inclination of the protrusion along the first axial end surface.

12. The gear wheel according to claim 1, wherein each of the plurality of angularly spaced protrusions comprises a curve-shaped portion.

13. The gear wheel according to claim 1, wherein the gear wheel comprises a second plurality of angularly spaced protrusions arranged on the second axial end surface and extending axially from the second axial end surface in a direction of a surface normal of the second axial end surface.

14. A vehicle transmission arrangement arranged in a gearbox housing comprising a lubricant reservoir with a lubricant, the vehicle transmission arrangement comprising a transmission shaft and a gear wheel connected to the transmission shaft, wherein the gear wheel is partially positioned in the lubricant reservoir for receiving lubrication, the gear wheel comprising a first axial end surface; a second axial end surface arranged on an opposite side of the gear wheel relative to the first axial end surface; and a plurality of gear teeth arranged circumferentially on the gear wheel and positioned between the first and second axial end surfaces; wherein the gear wheel comprises a plurality of angularly spaced protrusions arranged on the first axial end surface and extending axially from the first axial end surface in a direction of a surface normal of the first axial end surface, wherein each of the angularly spaced protrusions comprises a driving end and a trailing end, the trailing end protrudes axially from the first axial end surface to a greater extent than the driving end, wherein the gear wheel is configured to rotate in a rotational direction in which the driving end reaches the lubricant in the lubricant reservoir before the trailing end reaches the lubricant.

15. The vehicle transmission arrangement according to claim 14, further comprising an input shaft arranged to receive a torque from a vehicle prime mover, and an output shaft arranged to provide a torque to wheels of a vehicle, wherein the transmission shaft is a counter shaft arranged to transmit the torque from the input shaft to the output shaft.

* * * * *